United States Patent Office 3,763,181
Patented Oct. 2, 1973

3,763,181
5-METHYL-PYRAZOL-3-YL-THIONOPHOSPHONIC ACID ESTERS
Christa Fest, Wuppertal-Elberfeld, Ingeborg Hammann, Cologne, and Günter Unterstenhöfer, Opladen, Germany, assignors to Bayer Aktiengesellschaft, Leverkusen, Germany
No Drawing. Continuation of abandoned application Ser. No. 847,733, Aug. 5, 1969. This application Dec. 30, 1971, Ser. No. 214,474
Int. Cl. C07d 49/18
U.S. Cl. 260—310 R        4 Claims

ABSTRACT OF THE DISCLOSURE 5-methyl-pyrazol-3-yl-thionophosphonic acid esters, i.e. (alkyl and phenyl)-O-alkyl-O-(5-methyl-pyrazol-3-yl)-thionophosphonic acid esters, which possess arthropodicidal, especially acaricidal and insecticidal, properties and which may be produced by conventional methods.

---

This is a continuation of application Ser. No. 847,733, filed Aug. 5, 1969.

The present invention relates to and has for its objects the provision for particular new 5-methyl-pyrazol-3-yl-thionophosphonic acid esters, i.e. (alkyl and phenyl)-O-alkyl-O-(5-methyl-pyrazol-3-yl) - thionophosphonic acid esters, which possess arthropodicidal, especially insecticidal and acaricidal, properties, active compositions in the form of mixtures of such compounds with solid and liquid dispersible carrier vehicles, and methods for producing such compounds and for using such compounds in a new way especially for combating pests, e.g. arthropods, with other and further objects becoming apparent from a study of the within specification and accompanying examples.

In U.S. Pat. 2,754,244 there are described, among other things, O,O-dialkyl-O-[5-methyl-pyrazol-3 - yl] - phosphoric or -thionophosphoric acid esters, such as O,O-dimethyl-O-[5-methyl-pyrazol-3-yl]-thionophosphoric acid ester (A) and O,O-diethyl-O-[5-methylpyrazol - 3 - yl-thionophosphoric acid ester (B). These known compounds, which possess some pesticidal activity, can be prepared by reaction of equimolar amounts of the O,O-dialkyl-(thiono)-phosphoric acid ester chlorides concerned and 5-methyl-pyrazol-3-one, that is in the form of 5-methyl-3-hydroxy-pyrazole.

It has now been found, in accordance with the present invention, that the particular new 5-methyl-pyrazol-3-yl thionophosphonic acid esters of the formula $$\text{CH}_3-\underset{\underset{\text{H}}{|}}{\overset{}{\underset{N}{\underset{|}{\overset{\phantom{X}}{\big\langle}}}}}\overset{}{\underset{N}{\big\rangle}}-O-\overset{\overset{S}{\|}}{\underset{\phantom{X}}{P}}\overset{R_1}{\underset{OR_2}{}} \quad (I)$$

in which $R_1$ is alkyl of 1–4 carbon atoms or phenyl, and
$R_2$ is alkyl of 1–4 carbon atoms, exhibit strong arthropodicidal, especially insecticidal and acaricidal, properties.

It has been furthermore found, in accordance with the present invention, that the particular new compounds of Formula I above may now be produced by the process which comprises reacting a thionophosphonic acid ester halide of the formula $$\overset{R_1}{\underset{R_2O}{}}\overset{\overset{S}{\|}}{P}-\text{Hal} \quad (II)$$

in which $R_1$ and $R_2$ are the same as defined above, and
Hal is a halogen atom, such as chloro, bromo, iodo and fluoro, and especially chloro, with 3-hydroxy-5-methyl-pyrazole of Formula III below.

Advantageously, the compounds of Formula I above according to the present invention are distinguished by outstanding insecticidal and acaricidal properties. Such compounds possess an excellent effectiveness against biting as well as against sucking insects. Moreover, the instant compounds exhibit a distinct herbicidal and rodenticidal complementary effect. Actually, the instant alkyl and phenyl-O-alkyl-O-(5-methyl-pyrazol-3 - yl) - thionophosphonic acid esters are clearly superior to the above-mentioned known corresponding O,O-dialkyl compounds (A) and (B). The new compounds of the present invention therefore represent a valuable enrichment of the art.

The course of the above-mentioned process is illustrated by the following reaction scheme:

$$\overset{R_1}{\underset{R_2O}{}}\overset{\overset{S}{\|}}{P}-\text{Hal} + \text{CH}_3-\underset{\underset{\text{H}}{|}}{\overset{}{\underset{N}{\underset{|}{\overset{\phantom{X}}{\big\langle}}}}}\overset{}{\underset{N}{\big\rangle}}-OH \quad \xrightarrow{-\text{HHal}} \quad \text{CH}_3-\underset{\underset{\text{H}}{|}}{\overset{}{\underset{N}{\underset{|}{\overset{\phantom{X}}{\big\langle}}}}}\overset{}{\underset{N}{\big\rangle}}-O-\overset{\overset{S}{\|}}{P}\overset{R_1}{\underset{OR_2}{}}$$

(II)         (III)         (I)

In the foregoing equation, the symbols $R_1$, $R_2$ and Hal are the same as defined above.

Advantageously, in accordance with the present invention, in the various formulae herein:

$R_1$ represents straight and branched chain lower alkyl hydrocarbon of 1–4 carbon atoms such as methyl, ethyl, n- and isopropyl, n-, iso-, sec.- and tert.-butyl, and the like especially $C_{1-3}$ or $C_{1-2}$ alkyl; or phenyl; and $R_2$ represents straight and branched chain lower alkyl of 1–4 carbon atoms such as methyl to tert.-butyl inclusive as defined above, and the like, especially $C_{1-3}$ or $C_{1-2}$ or $C_{2-4}$ or $C_{2-3}$ alkyl, and more especially ethyl;

$R_1$ and $R_2$ being the same or different when both are $C_{1-4}$ alkyl.

Preferably, $R_1$ is $C_{1-3}$ or $C_{1-2}$ alkyl; or phenyl; and $R_2$ is $C_{1-3}$ or $C_{1-2}$ alkyl.

In particular, $R_1$ is $C_{1-2}$ alkyl; or phenyl; and $R_2$ is ethyl.

When carrying out the production reaction according to the present invention, preferably the free 3-hydroxy-5-methyl-pyrazole is used and the reaction is caused to proceed in the presence of an acid-binding agent. For this purpose, practically all customary acid acceptors may be used. Particularly suitable, however, are alkali metal alcoholates and carbonates, such as sodium or potassium methylate, ethylate and carbonate, as well as tertiary aliphatic, aromatic or heterocyclic amines, for example triethylamine, dimethylaniline, dimethylbenzylamine or pyridine; and the like.

The production process is preferably carried out with the use of a solvent (which term includes a mere diluent). As such, practically all inert organic solvents or mixtures thereof are suitable, such as hydrocarbons, for example benzine, benzene, toluene, chlorobenzene, xylene; ethers, for example diethyl ether, di-n-butyl ether and dioxan; further, ketones, for example acetone, methylethyl ketone, methylisopropyl ketone and methylisobutyl ketone; and the like. For the said purpose, however, particularly good results have been obtained with low-boiling aliphatic alcohols, for example methanol and ethanol, and, above all, nitriles, for example acetonitrile and propionitrile, and dimethyl formamide; and the like.

When carrying out the production reaction, the temperature of the mixture can be varied within a fairly wide range. In general, the reaction is carried out at from substantially between about 30–70° C.

The starting materials, as well as any auxiliary materials to be used (e.g. acid-binding agents), are, in general, used in equimolar amounts.

After combining the starting materials, it is advantageous to continue stirring the mixture for a long period (e.g. 3 to 10 hours) in order to complete the reaction. The products are then obtained with good yields and in high purity.

The 5-methyl-pyrazol-3-yl-thionophosphonic acid esters according to the present invention are obtained in most cases in the form of colorless to yellow-colored, water-insoluble oils which, by so-called "slight distillation," that is heating to moderately elevated temperatures for long periods under reduced pressure, can be freed from the last volatile components and can in this way be purified. Their structure is indicated by infra-red and NMR spectra.

Advantageously, the active compounds of Formula I above are distinguished by outstanding insecticidal and acaricidal effectiveness. The effect sets in rapidly and is long lasting. Such compounds also possess at the same time only a slight mammalian toxicity and a concomitantly slight phytotoxicity. For this reason, the compounds according to the present invention can be used with success in crop protection endeavors for the control of noxious sucking and biting insects and Diptera, as well as against mites (Acarina).

To the sucking insects contemplated herein there belong, in the main, aphids (Aphidae) such as the green peach aphid (*Myzus persicae*), the bean aphid (*Doralis fabae*), the bird cherry aphid (*Rhopalosiphum padi*), the pea aphid (*Macrosiphum pisi*) and the potato aphid (*Macrosiphum solanifolii*), the currant gall aphid (*Crytomyzus korschelti*), the mealy apple aphid (*Sappaphis mali*), the mealy plum aphid (*Hyalopterus arundinis*) and the cherry black-fly (*Myzus cerasi*); in addition, scales and mealybugs (Coccina), for example the oleander scale (*Aspidiotus hederae*) and the soft scale (*Lecanium hesperidum*) as well as the grape mealybug (*Pseudococcus maritimus*); thrips (Thysanoptera), such as *Hercinothrips femoralis*, and bugs, for example the beet bug (*Piesma quadrata*), the cotton bug (*Dysdercus intermedius*), the bed bug (*Cimex lectularius*), the assassin bug (*Rhodnius prolixus*) and Chagas' bug (*Triatoma infestans*), and, further, cicadas, such as *Euscelis bilobatus* and *Nephotettix bipunctatus*; and the like.

In the case of the biting insects contemplated herein, above all there should be mentioned butterfly caterpillars (Lepidoptera), such as the diamond-back moth (*Plutella maculipennis*), the gipsy moth (*Lymantria dispar*), the brown-tail moth (*Euproctis chrysorrhoea*) and tent caterpillar (*Malacosoma neustria*); further, the cabbage moth (*Mamestra brassicae*) and the cutworm (*Agrotis segetum*), the large white butterfly (*Pieris brassicae*), the small winter moth (*Cheimatobia brumata*), the green oak tortrix moth (*Tortrix viridana*), the fall armyworm (*Laphygma frugiperda*) and cotton worm (*Prodenia litura*), the ermine moth (*Hyponomeuta padella*), the Mediterranean flour moth (*Ephestia Kühniella*) and greater wax moth (*Galleria mellonella*); and the like.

Also to be classed with the biting insects contemplated herein, are beetles (Coleoptera), for example the granary weevil (*Sitophilus granarius=Calandra granaria*), the Colorado beetle (*Leptinotarsa decemlineata*), the dock beetle (*Gastrophysa viridula*), the mustard beetle (*Phaedon cochleariae*), the blossom beetle (*Meligethes aeneus*), the raspberry beetle (*Byturus tomentosus*), the bean weevil (*Bruchidius=Acanthoscelides obtectus*), the leather beetle (*Dermestes frischi*), the khapra beetle (*Trogoderma granarium*), the flour beetle (*Tribolium castaneum*), the northern corn billbug (*Calandra* or *Sitophilus zeamais*), the drugstore beetle (*Stegobium paniceum*), the yellow mealworm (*Tenebrio molitor*) and the saw-toothed grain beetle (*Oryzaephilus surinamensis*), but also species living in the soil, for example wireworms (Agriotes spec.) and larvae of the cockchafer (*Melolontha melolontha*), cockroaches, such as the German cockroach (*Blattella germanica*), American cockroach (*Periplaneta americana*), Madeira cockroach (*Laucophaea* or *Rhyparobia madeirae*), Oriental cockroach (*Blatta orientalis*), the giant cockroach (*Blaberus giganteus*) and the black giant cockroach (*Blaberus fuscus*) as well as *Henschoutedenia flexivitta*; further, Orthoptera, for example the house cricket (*Gryllus domesticus*); termites such as the eastern subterranean termite (*Reticulitermes flavipes*) and Hymenoptera such as ants, for example the garden ant (*Lasius niger*); and the like.

The Diptera contemplated herein comprise essentially the flies, such as the vinegar fly (*Drosophila melanogaster*), the Mediterranean fruit fly (*Ceratitis capitata*), the house fly (*Musca domestica*), the little house fly (*Fannia canicularis*), the black blow fly (*Phormia aegina*) and bluebottle fly (*Calliphora erythrocephala*) as well as the stable fly (*Stomoxys calcitrans*); further, gnats, for example mosquitos such as the yellow fever mosquito (*Aedes aegypti*), the northern house mosquito (*Culex pipiens*) and the malaria mosquito (*Anopheles stephensi*); and the like.

In the case of the mites (Acari) contemplated herein, there are classed, in particular, the spider mites (Tetranychidae) such as the two-spotted spider mite (*Tetranychus telarius=Tetranychus althaeae* or *Tetranychus urticae*) and the European red mite (*Paratetranychus pilosus=Panonychus ulmi*), blister mites, for example the currant blister mite (*Eriophyes ribis*) and Tarsonemids, for example the broad mite (*Hemitarsonemus latus*) and the cyclamen mite (*Tarsonemus pallidus*); finally, ticks, such as the relapsing fever tick (*Ortnithodorus moubata*); and the like.

The active compounds according to the instant invention can be utilized, if desired, in the form of the usual formulations or compositions with conventional inert (i.e. plant compatible or herbicidally inert) pesticidal diluents or extenders, i.e. diluents or extenders of the type usable in conventional pesticidal dispersible carrier vehicles such as solutions, emulsions, suspensions, emulsifiable concentrates, spray powders, pastes, soluble powders, dusting agents, granules, etc. These are prepared in known manner, for instance by extending the active compounds with conventional pesticidal dispersible liquid diluent carriers and/or dispersible solid carriers optionally with the use of carrier vehicle assistance, e.g. conventional pesticidal surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: inert dispersible liquid diluent carriers, including inert organic solvents, such as aromatic hydrocarbons (e.g. benzene, toluene, xylene, etc.), halogenated especially chlorinated, aromatic hydrocarbons (e.g. chlorobenzenes, etc.), paraffins (e.g. petroleum fractions), chlorinated aliphatic hydrocarbons (e.g. methylene chloride, etc.), alcohols (e.g. methanol, ethanol, propanol, butanol, etc.), amines (e.g. ethanolamine, etc.), ethers, ether-alcohols (e.g. glycol monomethyl ether, etc.), amides (e.g. dimethyl formamide, etc.), sulfoxides (e.g. dimethyl sulfoxide, etc.), ketones (e.g. acetone, etc.) and/or water; as well as inert dispersible finely divided solid carriers, such as ground natural minerals (e.g. kaolins, alumina, silica, chalk, i.e. calcium carbonate, talc, kieselguhr, etc.) and ground synthetic minerals (e.g. highly dispersed silicic acid, silicates, e.g. alkali silicates, etc.);

whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfonates, aryl sulfonates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other acaricides and insecticides, or fungicides, herbicides, bactericides, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.00001–20%, preferably 0.01–5%, by weight of the mixture. Thus, the present invention contemplates over-all compositions which comprise mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.00001–95%, and preferably 0.01–95%, by weight of the mixture.

The active compounds can also be used in accordance with the well known ultra-low-volume process with good success, i.e. by applying such compound if normally a liquid, or by applying a liquid composition containing the same, via very effective atomizing equipment, in finely divided form, e.g. average particle diameter of from 50–100 microns, or even less, i.e. mist form, for example by airplane crop spraying techniques. Only up to at most about a few liters/hectare are needed, and often amounts only up to about 1 quart/acre, preferably 2–16 fluid ounces/acre, are sufficient. In this process it is possible to use highly concentrated liquid compositions with said liquid carrier vehicles containing from about 20 to about 95% by weight of active compound or even the 100% active substance alone, e.g. about 20–100% by weight of the active compound.

Furthermore, the present invention contemplates methods of selectively killing, combating or controlling pests, e.g. arthropods, i.e. insects and acarids, and more particularly methods of combating at least one of insects and acarids which comprise applying to at least one of correspondingly (a) such insects, (b) such acarids, and (c) the corresponding habitat thereof, i.e. the locus to be protected, a correspondingly combative or toxic amount, i.e. an arthropodicidally, especially insecticidally or acaricidally, effective amount of the particular active compound of the invention alone or together with a carrier vehicle as noted above. The instant formulations or compositions are applied in the usual manner, for instance by spraying, atomizing, vaporizing, scattering, dusting, watering, squirting, sprinkling, pouring, fumigating, and the like.

It will be realized, of course, that the concentration of the particular active compound utilized in admixture with the carrier vehicle will depend upon the intended application. Therefore, in special cases it is possible to go above or below the aforementioned concentration ranges.

The unexpected superiority and outstanding activity of the particular new compounds of the present invention are illustrated, without limitation, by the following examples:

EXAMPLE 1

Plutella test

Solvent: 3 parts by weight acetone
Emulsifier: 1 part by weight alkylaryl polyglycol ether.

To produce a suitable preparation of the particular active compound, 1 part by weight of such active compound is mixed with the stated amount of solvent containing the stated amount of emulsifier, and the resulting concentrate is diluted with water to the desired final concentration.

Cabbage leaves (*Brassica oleracea*) are sprayed with the preparation of the given active compound until dew moist and are then infested with caterpillars of the diamond-back moth (*Plutella maculipennis*).

After the specified period of time, the degree of destruction is determined as a percentage: 100% means that all the caterpillars are killed, whereas 0% means that none of the caterpillars are killed.

The particular active compounds tested, their concentrations, the evaluation time and the results obtained can be seen from the following Table 1.

TABLE 1.—PLUTELLA TEST

| Active compound (constitution) | Concentration of active compound in percent | Degree of destruction in percent after 3 days |
|---|---|---|
| (A) — structure with S, OCH$_3$, OCH$_3$ groups on P; pyrazole ring with CH$_3$ and NH (known comparative compound) | 0.1 | 0 |
| (1$_1$) — structure with S, CH$_3$, OC$_2$H$_5$ groups on P; pyrazole ring with CH$_3$ and NH | 0.1 | 100 |
| (2$_1$) — structure with S, C$_2$H$_5$, OC$_2$H$_5$ groups on P; pyrazole ring with CH$_3$ and NH | 0.1<br>0.01 | 100<br>95 |
| (3$_1$) — structure with S, C$_6$H$_5$, OC$_2$H$_5$ groups on P; pyrazole ring with CH$_3$ and NH | 0.1 | 100 |

EXAMPLE 2

Myzus test (contact action)

Solvent: 3 parts by weight acetone
Emulsifier: 1 part by weight alkylaryl polyglycol ether.

To produce a suitable preparation of the particular active compound, 1 part by weight of such active compound is mixed with the stated amount of solvent containing the stated amount of emulsifier, and the resulting concentrate is diluted with water to the desired final concentration.

Cabbage plants (*Brassica oleracea*) which have been heavily infested with peach aphids (*Myzus persicae*) are sprayed with the preparation of the given active compound until dripping wet.

After the specified period of time, the degree of destruction is determined as a percentage: 100% means that all the aphids are killed, whereas 0% means that none of the aphids are killed.

The particular active compounds tested, their concentrations, the evaluation time and the results obtained can be seen from the following Table 2.

TABLE 2.—MYZUS TEST

| Active compound (constitution) | Concentration of active compound in percent | Degree of destruction in percent after 24 hours |
|---|---|---|
| (A) [structure: 3-methyl-pyrazol-5-yl O,O-dimethyl thionophosphate] (known comparative compound) | 0.1 | — |
| (B) [structure: 3-methyl-pyrazol-5-yl O,O-diethyl thionophosphate] (known comparative compound) | 0.1<br>0.01<br>0.001 | 100<br>30<br>0 |
| (1₂) [structure: methyl-O-ethyl-O-(5-methyl-pyrazol-3-yl)-thionophosphonate] | 0.1<br>0.01<br>0.001 | 100<br>100<br>90 |
| (2₂) [structure: ethyl-O-ethyl-O-(5-methyl-pyrazol-3-yl)-thionophosphonate] | 0.1<br>0.01<br>0.001 | 100<br>99<br>50 |

EXAMPLE 3

Tetranychus test

Solvent: 3 parts by weight acetone
Emulsifier: 1 part by weight alkylaryl polyglycol ether.

To produce a suitable preparation of the particular active compound, 1 part by weight of such active compound is mixed with the stated amount of solvent containing the stated amount of emulsifier, and the resulting concentrate is diluted with water to the desired final concentration.

Bean plants (*Phaseolus vulgaris*), which have a height of approximately 10–30 cm., are sprayed with the preparation of the given active compound until dripping wet. These bean plants are heavily infested with spider mites (*Tetranychus telarius*) in all stages of development.

After the specified period of time, the effectiveness of the preparation of the given active compound is determined by counting the dead mites. The degree of destruction thus obtained is expressed as a percentage: 100% means that all the spider mites are killed, whereas 0% means that none of the spider mites are killed.

The particular active compounds tested, their concentrations, the evaluation time and the results obtained can be seen from the following Table 3.

TABLE 3.—TETRANYCHUS TEST

| Active compound (constitution) | Concentration of active compound in percent | Degree of destruction in percent after 8 days |
|---|---|---|
| (A) [structure: 3-methyl-pyrazol-5-yl O,O-dimethyl thionophosphate] (known comparative compound) | 0.1 | 0 |
| (B) [structure: 3-methyl-pyrazol-5-yl O,O-diethyl thionophosphate] (known comparative compound) | 0.1 | 0 |
| (1₃) [structure: methyl-O-ethyl-O-(5-methyl-pyrazol-3-yl)-thionophosphonate] | 0.1 | 100 |
| (2₃) [structure: ethyl-O-ethyl-O-(5-methyl-pyrazol-3-yl)-thionophosphonate] | 0.1 | 70 |

The following further examples are set forth to illustrate, without limitation, the process for producing the instant active compounds according to the present invention.

EXAMPLE 4

(3₂)

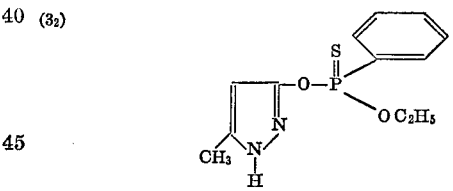

30 g. (0.3 mol) triethylamine are added to a solution of 30 g. (0.3 mol) 3-hydroxy-5-methyl-pyrazole in 150 ml. acetonitrile. 67 g. (0.3 mol) phenyl-thionophosphonic acid O-ethyl ester chloride are then added dropwise to the reaction mixture at 40° C., and the latter is further heated to 50° C. for 3 hours. Thereafter, the mixture is further stirred overnight at room temperature, then taken up in chloroform and diluted with water. Finally, the chloroform solution is concentrated and the reaction product is slightly distilled under greatly reduced pressure.

51 g. (60.7% of the theory) of phenyl-O-ethyl-O-(5-methyl-pyrazol-3-yl)-thionophosphonic acid ester, with the refractive index $n_D^{30}=1.5216$, are obtained.

Analysis for $C_{12}H_{15}N_2O_2PS$ (molecular weight 281).—Calculated (percent): N, 9.98. Found (percent): N, 9.66.

In analogous manner, the following compounds can also be prepared:

(1₄)

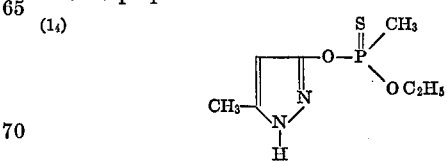

Yield: 79% of the theory of methyl-O-ethyl-O-(5-methyl-pyrazol-3-yl)-thionophosphonic acid ester, with the refractive index $n_D^{30}=1.5298$.

Analysis for $C_7H_{13}N_2O_2PS$ (molecular weight 220).—
Calculated (percent): N, 12.80; P, 14.13; S, 14.60. Found (percent): N, 12.76; P, 13.87; S, 14.65.

(24)

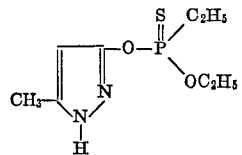

Yield: 81.5% of the theory of ethyl-O-ethyl-O-(5-methyl-pyrazol-3-yl)-thionophosphonic acid ester, with the refractive index: $n_D^{30}=1.5186$.

Analysis for $C_8H_{15}N_2O_2PS$ (molecular weight 234).—
Calculated (percent): P, 1331. Found (percent): P, 13.83.

It will be realized that all of the foregoing compounds contemplated by the present invention possess the desired selective pesticidal, especially arthropodicidal, i.e. insecticidal or acaricidal, properties for combating insects and acarids, and that such compounds have not only a very slight toxicity toward warm-blooded creatures, but also a concomitantly low phytotoxicity.

As may be used herein, the terms "arthropod," "arthropodicidal" and "arthropodicide" contemplate specifically both insects and acarids. Thus, the insects and acarids may be considered herein collectively as arthropods to be combated in accordance with the invention, and accordingly the insecticidal and/or acaricidal activity may be termed arthropodicidal activity, and the concomitant combative or effective amount used will be an arthropodicidally effective amount which in effect means an insecticidally or acaricidally effective amount of the active compound for the desired purposes.

It will be appreciated that the instant specification and examples are set forth by way of illustration and not limitation, and that various modifications and changes may be made without departing from the spirit and scope of the present invention.

What is claimed is:
1. 5-methyl-pyrazol-3-yl-thionophosphonic acid ester of the formula

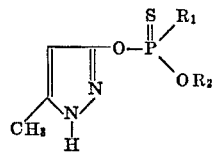

in which $R_1$ is selected from the group consisting of alkyl of 1–3 carbon atoms, and $R_2$ is alkyl of 1–3 carbon atoms.

2. Compound according to claim 1 wherein $R_1$ is $C_{1-2}$ alkyl, and $R_2$ is ethyl.

3. Compound according to claim 1 wherein such compound is methyl-O-ethyl-O-(5-methyl-pyrazol-3-yl) - thionophosphonic acid ester of the formula

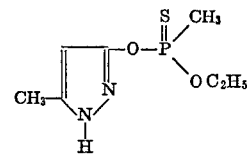

4. Compound according to claim 1 wherein such compound is ethyl-O-ethyl-O-(5-methyl-pyrazol-3-yl)-thionophosphonic acid ester of the formula

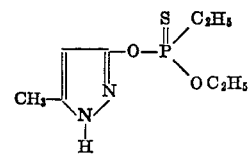

References Cited
UNITED STATES PATENTS
3,246,005   4/1966   Szabo et al. _____ 260—306.5

OTHER REFERENCES
Hurakawa et al.: Japan 17,677, Chem. Abstracts, 60:6869f (1964).

HENRY R. JILES, Primary Examiner
G. T. TODD, Assistant Examiner

U.S. Cl. X.R.
424—273